United States Patent [19]

Cerff

[11] Patent Number: 4,829,185
[45] Date of Patent: May 9, 1989

[54] NEUTRON AND/OR GAMMA RADIATION DETECTING SYSTEM

[75] Inventor: Karlheinz Cerff, Kandel, Fed. Rep. of Germany

[73] Assignee: Kernforschungszentrum Karlsruhe GmbH, Karlsruhe, Fed. Rep. of Germany

[21] Appl. No.: 654,504

[22] Filed: Sep. 26, 1984

[30] Foreign Application Priority Data

Sep. 30, 1983 [DE] Fed. Rep. of Germany ...... 3335512

[51] Int. Cl.$^4$ ............................................. G01T 1/20
[52] U.S. Cl. ............................... 250/361 R; 250/368; 250/390.11
[58] Field of Search ................. 250/361 R, 368, 390 J

[56] References Cited

U.S. PATENT DOCUMENTS

| 3,930,160 | 12/1975 | Swinehart ........................... | 250/361 |
| 4,023,039 | 5/1977 | Galves et al. ..................... | 250/361 R |
| 4,059,765 | 11/1977 | Yatsuta et al. ................... | 250/361 R |
| 4,532,425 | 7/1985 | Abileah et al. ...................... | 250/368 |

FOREIGN PATENT DOCUMENTS

| 1228005 | 11/1966 | Fed. Rep. of Germany ... | 250/390 J |
| 57-82784 | 5/1982 | Japan ............................. | 250/361 R |
| 143480 | 10/1960 | U.S.S.R. ............................. | 250/361 |

OTHER PUBLICATIONS

Eckardt et al., "A Novel light-collect Syst. for Segmented Scint-Counter Color." Nucl. Inst. & Meth. 155, (3) p. 398 (1978).
Sun et al., "Scint. Counters" Nucleonis (Jul. 1956).
Emmerich, W. "A Fast Neutron Scintillator" Rev. Scien. Inst. vol. 25, No. 1 (Jan. 1954).

Primary Examiner—Carolyn E. Fields
Assistant Examiner—Richard Hanig

[57] ABSTRACT

In a neutron and/or gamma radiation detection system, a large reception surface for the radiation to be detected is formed on a body of scintillation material which is adapted to convert neutron or gamma radiation into light energy. A large number of fiber light conductors is embedded in the body of scintillation material such that the fibers extend essentially parallel and fully across the reception surface of the body of scintillation material. The light energy, upon propagation along the fiber light conductors, is coupled into the conductors along the surface of the fibers, which fibers are anisotropic.

This arrangement permits the use of anisotropic light conductor systems which, in contrast to optically isotropic systems, provide for a separation of light collecting and light transmitting functions which results in a substantial reduction of light absorption losses during light transmission so that most of the light energy coupled into the fiber light conductors reaches the opto-electronic amplifier coupled to the end of the light conductors.

6 Claims, 3 Drawing Sheets

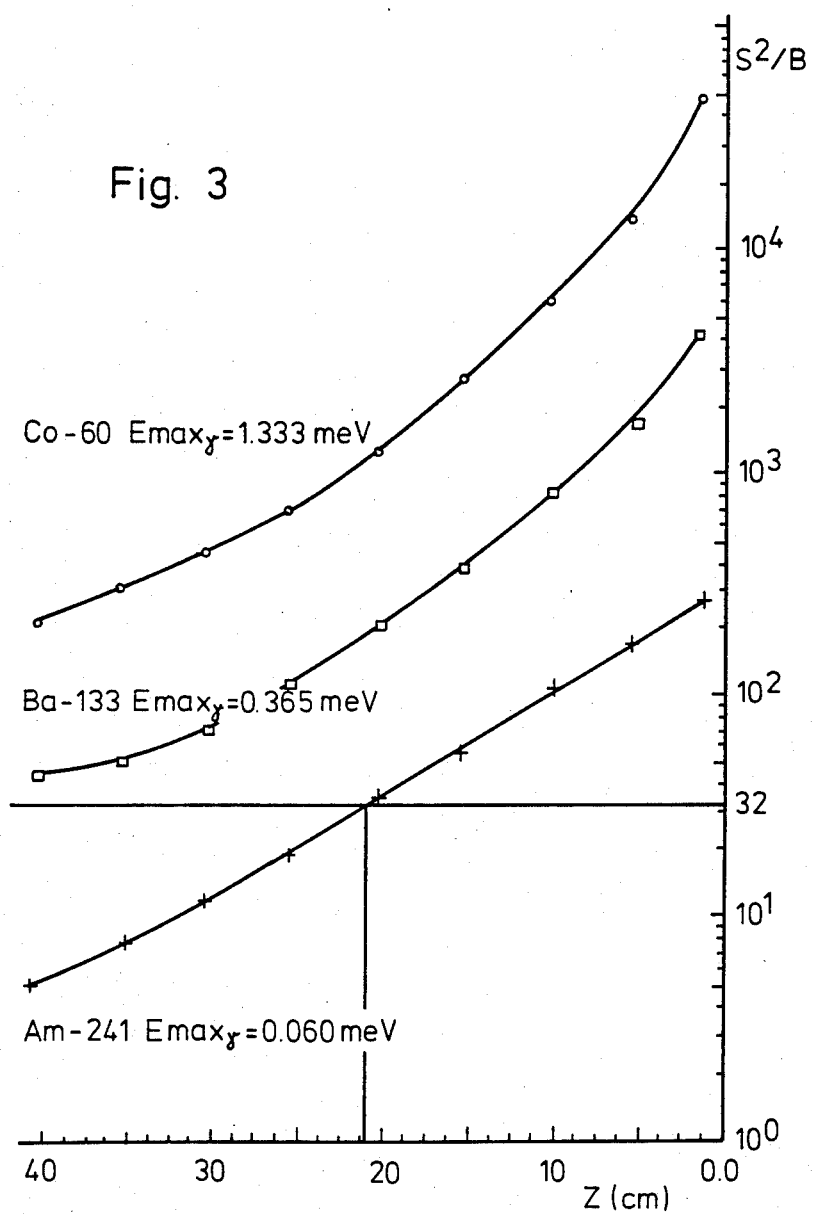

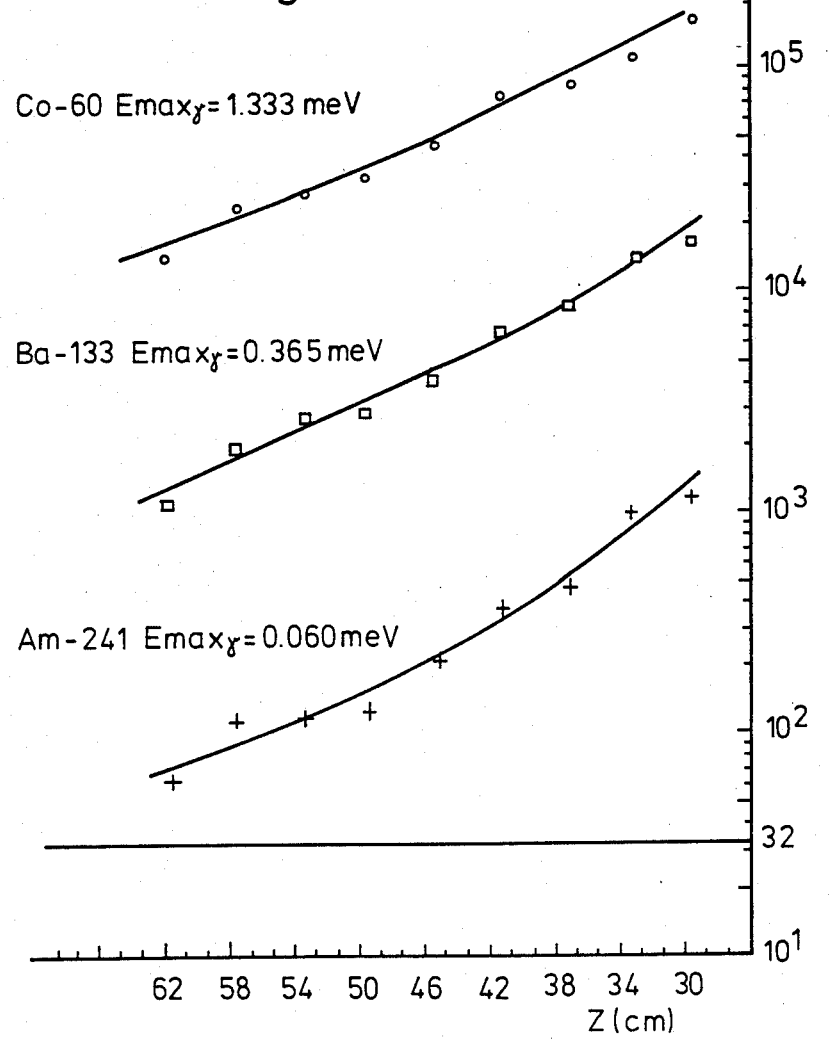

NEUTRON AND/OR GAMMA RADIATION DETECTING SYSTEM

BACKGROUND OF THE INVENTION

The invention relates to a neutron and/or gamma radiation detecting system with a large reception area for the radiation to be detected, which radiation generates in scintillation materials light energy that is coupled into fiber light conductors. The system is especially suitable for use in connection with revolving door safety locks.

Neutron detection is utilized as a supplementary measure in connection with lock structures for the detection of unauthorized passage of nuclear materials. This measure increases the chances of detecting the transfer of nuclear materials out of controlled areas without permission since measures adapted to avoid detection of neutron radiation are substantially more involved than measures which do not need consider the detection of $\gamma$ radiation.

ZnS(Ag) is one of the compounds with the highest scintillation available for the purpose of neutron detection. However, in order to provide an effective detector, efficient light collection and its transmission from the scintillator to the photomultiplier are necessary. The light collector arrangements utilized so far are as follows:

In a publication K. H. Sun, P. R. Malmberg, F. A. Pecjak, "Scintillation Counters", Nucleonis (July 1956), a detector disc is mounted directly on the photomultiplier (PTM), the detector disc being disposed in the entrance window for the radiation. In this arrangement the light transmission path is short and transmission losses are therefore small. A disadvantage, however, is that the coupling cross-section is limited by the size of the window of the photomultiplier utilized. In another arrangement as disclosed in publication W. S. Emmerich, "A Fast Neutron Szintillator", Rev. Scien. Inst., Vol. 25, No. 1, Jan. 1954, a substantially larger usable coupling cross-section (five times larger) is obtained by the use of light guide plates integrated into the scintillator but these units can be built only in small sizes with only a small angle of reception which would cover only a small part of a revolving door chamber, for example.

The disadvantages of light conductors as they are presently used are:

Scattering losses in the contact area between light conductors and the optically denser scintillator materials.

Attenuation losses (light absorption in the necessary transmission length).

Unfavorable surface ratios between light conductor cross-section and collector surface (decoupling area).

The decoupling efficiency of larger scintillator crystals, dependent on the index of refraction, is in the range of 5-11%.

The values given for the coupling and transmission efficiencies of isotropic light conductors (with interface areas with material of optically low density, i.e., air) show that, for scintillators with large surface areas, suitable optical systems have to comply with the following requirements:

Decoupling of light source and light conductor by interposing an optical intermediate layer with an index of refraction which is smaller than that of the scintillator ($n \approx 1.5$) so as to avoid scattering losses at the interface.

Coupling of a light intensity sufficient for the transmission distance between the scintillator and the photomultiplier.

Feeding of the light into the fibers through face areas is utilized in connection with low level light amplifiers and large display areas as shown in a publication W. B. Allan, "Fibre Optics, Theory and Practice", Plenum Press, London, NY, 1973—in reverse of a detector application. A disadvantage, however, is a need for a relatively large amount of fiber material and a relatively low reduction factor achievable for the coupling-in surface/uncoupling surface ratio.

The object of the presnt invention is to provide a large area detection system of the type described which, however, permits utilization of an effective scintillation material and also to take advantage of the properties of fibers for the transmission of light to the detector systems.

SUMMARY OF THE INVENTION

A neutron and/or gamma radiation system which includes a body of scintillation material in which light is generated by the neutron or gamma radiation to be detected has embedded into the body of scintillation material a plurality of fiber light conductors into which the light generated by the neutron or gamma radiation is coupled for transmission to a detector circuit. The body of scintillation material has a large radiation reception surface and the fiber light conductors are preferably so embedded therein that they extend parallel to, and fully across, the reception surface such that the light generated in the scintillation material and propagating along the fiber light conductors is coupled into the conductors, through the conductors' side surfaces, which conductors are anisotropic and through which the light is transmitted without any substantial losses.

With this arrangement, anisotropic light conductor systems can be utilized which, in contrast to the optically isotropic systems, result in a separation of light collecting and light conducting functions. This provides for a substantial reduction of light absorption losses in large-space detector systems. The light intensity coupled in through the light conductor surface reaches the optoelectronic amplifier coupled to the end of the light conductor essentially without any losses.

The light coupling mechanism utilized for coupling the light through the fiber surface is based on the synchronization of the phase velocities and direction of polarization of the surface wave components of the resonance frequencies excitable in the fiber core.

It has been confirmed by experiments that, with fibers having a circular cross-section, light may be coupled into fibers through the fiber cylinder surfaces because of the geometry of the electromagnetic fields. The mode volume (that is, the number of possible natural frequencies), which increases with increasing fiber core radius or fiber diameter, increases the probability of synchronization of both fields within the fiber. This is especially important for the coupling of incoherent light with timely and spatially stochastic phase changes.

Although these properties of cylindrical symmetrical fibers are known, they have been utilized, so far, only in limited applications such as:

Anisotropic thin-film light guides in a planar geometry which lead to other limiting conditions for the coupling of light upon utilization of the optical tunneling effect.

The coupling of coherent light sources (lasers) which lead to stationary coupling conditions.

However, these properties have not been utilized technically, that is, optically anisotropic fiber light conductors have not been utilized in connection with neutron detectors.

SHORT DESCRIPTION OF THE DRAWINGS

FIG. 3 is a graph showing the signal/background noise ratio relative to the center of a detector plate, and FIG. 4 shows the signal/background noise ratio depending on the distance from the photomultiplier at the end of the fiber light conductor.

DESCRIPTION OF THE PREFERRED EMBODIMENT

Figure 1:
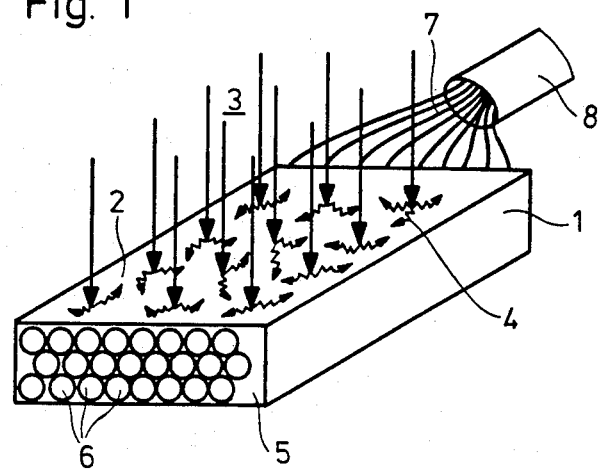
FIG. 1 shows a fiber detector in principle.

As shown schematically in FIG. 1, a fiber detector 1 has a reception surface 2 for the coupling of light, the surface 2 being formed on a prismatic body 5 (ZnS(Ag)-/boron matrix). The neutron flux (3) generates in the scintillation material of the body 5, flashes of light which light is collected by the parallel fibers 6 disposed in the body in several superimposed layers (three layers being shown in FIG. 1). The fibers 6 are combined to bundles 7 preferably at both ends of the body 5 and extend to the photomultipliers 8.

The following considerations are presented for an understanding of the relationship between illumination intensity and surface ratio of the light collecting surface area (the sum of the surfaces of the various fibers 6) with fibers of different diameters: The illumination intensities achievable at the surface 2, that is, at the light coupling face (interface $n_1/n_2$), correspond to the ratio of light collecting surface areas A which is determined by the radius R of the fibers. With a reduction of the radius R, the cylindrical fiber surface is reduced proportional to R. The circular fiber face, however, is reduced proportional to $R^2$. In order to obtain a constant light collecting surface in the scintillator upon reduction of the fiber diameter, it is necessary to correspondingly increase the number of fibers. Since the face area of a fiber bundle decreases with the square of the fiber radius, the increase in coupling surface by addition of fibers 6 is determined by the equation:

$$\frac{\frac{R_1}{A \text{ fiber}}}{\frac{R_2}{A \text{ fiber}}} = \frac{R_2}{R_1} \text{ with } R_1 > R_2$$

A large embedded cylinder surface area provides for a reduction of the distance of the scintillator (point) light sources from the adjacent light conductor surface which results in an increase of the light intensity coupled into the fiber light conductor 6.

The following table shows the distances between light source and coupling location for a number of common fiber conductor diameters under the given conditions.

| Fiber Diameter ($\mu$) | Number Of Fibers | Fiber Surface Area (m$^2$) | Distance ($\mu$) |
| --- | --- | --- | --- |
| 1500 | 1100 | 8.3 | 400 |
| 1050 | 2270 | 12.0 | 315 |
| 500 | 10000 | 25.1 | 150 |
| 100 | 250000 | 126.0 | 30 |
| 70 | 510200 | 180.0 | 21 |
| 30 | 2777780 | 420.0 | 9 |
| 10 | 25000000 | 1257.0 | 3 |

It is found herefrom that, with fibers of 1500 $\mu$ and 70 $\mu$, a ratio of illumination intensity of 1/363 at the point of light coupling, that is, at the interface $n_1/n_2$, is obtained.

The previous presentation gives some indication for the geometric configuration suitable for a fiber light conductor-detector. Important considerations, however, are also:

The mechanism of the light coupling by way of the fiber surface area.

The transmission characteristics for the light energy coupled into the fibers.

Anisotropic light conductors consist of two components: the core with a refraction index $n_1$ and the coating with a refraction index $n_2$; in connection with light transmission, the electromagnetic energy is concentrated mainly in the material with the higher refraction index $n_1$ (refer to publication N. S. Kapany, J. J. Burke, "Fiber Optics IX. Waveguide Effects", J. Am. Opt. Soc., Vol. 51, No. 10, Oct. 1961.

The propagation conditions are in accordance with the laws of the geometric optics (Snellius-Fresnell laws of refraction and reflection, publication W. Pohl, "Optik and Atomphysik", Springer 1928 for the total reflection occurring at the interface to the optically thinner medium. Without detailed explanation of the theory, the following consequences are pointed out:

The transmission of light is based on the principle of total reflection in the optically thinner medium $n_2$. With a finite light conductor diameter, the fiber conductor has discrete propagation conditions (natural mode) depending on the light wave length $\lambda$, the numeric aperture NA and the fiber conductor core radius a.

In contrast to the interference of the teachings of the geometrical optics, during total reflection, energy will in fact enter the "forbidden" optical medium of lower density $n_2$ (see publication M. Born, "Optik", Springer, Berlin 1933). Herein, the wave propagation vector $k_o$ is parallel to the interface $n_1/n_2$ and within $n_2$. The light conductor losses of the fiber core in the form of radiation losses into the surrounding material depend on the thickness S of the fiber coating (tunnel region). Generally, the coating thickness is about 7–10 light wave lengths considering multimode fibers and a wave length range of $\lambda \sim 0.5$ $\mu$ (visible light).

There occurs a spiral light propagation which permits coupling of the external scintillator light with the synchronous surface wave field in the tunnel region of the material $n_2$ without an additional coupler (for example, a prism). The light rays produced in the scintillator $LQ_n$ propagate in the shape of a cone and reach the interface $n_1/n_2$ tangentially. Synchronism of the phase velocity and direction of polarization in accordance with the selection of the angles incidence $\gamma_v$ and $\theta_v'$ in the interface area $n_1/n_2$ results in the excitation of the $v^{th}$ electromagnetic natural frequency within the fiber core by way of resonance through the surface wave field associated with the natural frequency.

Light coupling by utilization of the geometric effect of the curved optical interface area has, in practice, the following advantages:

There is no need for additional coupling systems usually utilized for the coupling of light into thin optical layers (prismatic couplers). The coupling mechanism is anisotropic with respect to a preference for the light path of the coupling. As a result, the coupled light energy remains within the fiber conductor for relatively long transmission distances.

The fiber surface represents a coupling area over its full length. Depending on the fiber quality, about 10%/m of the coupled light energy is lost by uncoupling and absorption losses.

Figure 2:
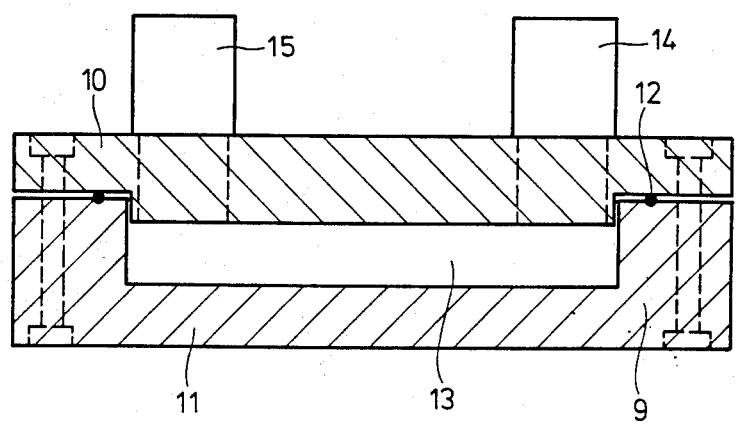
FIG. 2 shows an area detector element in cross-section.

For testing of the present detector concept, an area detector element for a revolving door was built as it is shown in cross-section in FIG. 2. The detector consists of a block-shaped housing 9 including cover and bottom parts 10, 11 which are bolted together and sealed by a gasket 12 so as to define a cavity 13 adapted to receive a scintillation material body 5 (of FIG. 1). The light conductor fiber bundles 7 extend through the two stubs 14, 15 which are arranged diagonally and support the bundles 7.

The sensitive detector surface is 900 cm$^2$. The diameters of the single fibers were 1500 $\mu$ embedded in a single layer in a ZnS(Ag) boric acid matrix. The use of fibers with such a large cross-section is disadvantageous from an optical point of view but it has a practical advantage as the larger fibers are easier to handle. In order to achieve a sufficiently high uncoupling efficiency with the relatively thick fibers as utilized, the fiber coating surface (outer interface area $n_0/n_2$) was roughened. The scattering centers so generated on the surfaces act like an optical grid coupler as it is used in connection with flat light guides. Scattering of the scintillator light reaching the interface $n_1/n_2$ normal to the surface into directions of incidents which are suitable for the coupling with the surface waves (synchronous) results in a 20 fold increase when compared with a smooth surface.

Measurements of the $\gamma$ sensitivity were performed under the following circumstances:

Optimal amplifier parameters were set on the basis of the specifications given in the data sheets of publication W. S. C. Chang, "Periodic Structures and their Application in Integrated Optics", IEEE Trans. on Microwave Theory and Techniques, Dec. 1973, p. 775 ff and by trial and error. The electronic amplifier circuitry utilized (photomultiplier Phillips XP 2230) is identical with that of the IRT liquid scintillator system for $\gamma$ radiation detection.

The discriminator threshold Uu and window with Uw were determined on the basis of the signal/background noise ratio $S^2/B$ for various $\gamma$ energy levels. The energy range taken into consideration includes Am-241 ($\bar{E} \simeq 60$ keV at Uu$\simeq$0.1 V), Ba-133 ($\bar{E} \simeq 360$ keV) to Co-60 ($\bar{E} \simeq 1170$ keV).

The discriminator setting was determined as a result of the measurements as Uu=0.1 V and Uw=3.0 V.

The signal/background noise ratio at different distances of the sources from the detector plate in relation to the center of the plate is shown in FIG. 3. Also marked in FIG. 3 as a line is the value $S^2/B = 5.65\sigma^2$ corresponding to a detection probability of 95% at a false alarm rate of 0.01%. The alarm threshold, set at $4\sigma$, takes changes in the stability of the electronic circuitry into consideration. The detection probability of 95% corresponds to a net signal $S = G - B$ of $1.65\sigma$ above the alarm threshold.

The required signal/background noise ratio is given by $$S^2/B = (5.64 \sqrt{B})^2/B = 32$$

independently of the absolute counting rate B. $S^2/B$ is a quality measure for the detector which is essentially independent of the setting of the amplifier parameters.

The measuring results as given in FIG. 3 were determined with various distances z from the center of the plate (x,y)=(5,5).

FIG. 4 shows for z=constant the signal/background noise ratio $S^2/B$ depending on different distances from the photomultiplier between a minimum distance of 30 cm and a maximum distance of 60 cm.

The results confirm the operability of anisotropic light conductors as collectors and transmitters even with conductors with relatively large cross-sections. The differences between neutron and $\gamma$ radiation counting rate efficiencies, as they are to be expected because of the different signal strengths, permit the conclusion that the ZnS(Ag) boric acid detector may be utilized also as a $\gamma$ radiation detector wherein signal separation may be obtained by the setting of different energy threshold levels.

I claim:

1. In a detection system for detecting radiation including neutron and gamma radiation, which system includes a body of scintillation material having a large reception surface for receiving the radiation to be detected, said radiation being capable of generating light energy within said body of scintillation material which light energy is coupled into fiber light conductors, the improvement, wherein said fiber light conductors are so embedded in the scintillation material that they extend parallel to and across the whole reception surface thereof, said fiber light conductors being provided with a coating having an index of refraction which is smaller than that of the fiber light conductor core so as to be anisotropic within said body of scintillation material and adapted to provide for coupling of the light energy into the fiber light conductors to take place along the whole superficies of the fiber light conductors.

2. A detection system according to claim 1, wherein said fiber light conductors are embedded in the scintillation material parallel to one another in a plurality of layers which are disposed parallel to the reception surface.

3. A detection system according to claim 1, wherein a light sensor (photomultiplier) is arranged at the end of the fiber light conductors, the arrangement being such that uncoupling of the light from said fiber light conductors takes place at the end faces of the fiber light conductors.

4. A detection system according to claim 1, wherein said fiber light conductors are symmetrically cylindrical.

5. A detection system according to claim 1, wherein the surface of the fiber light conductor coating is roughened.

6. A detection system according to claim 1, wherein said reception surface is rectangular in shape.

* * * * *